(12) United States Patent
Frie et al.

(10) Patent No.: US 12,365,122 B2
(45) Date of Patent: Jul. 22, 2025

(54) METHOD AND TOOL SYSTEM FOR MANUFACTURING A MULTI-COMPONENT PLASTIC MOLDED PART

(71) Applicant: Hella GmbH & Co. KGaA, Lippstadt (DE)

(72) Inventors: Klaus Frie, Lippstadt (DE); Udo Gottschling, Iserlohn (DE); Dietmar Haut, Lippstdt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 806 days.

(21) Appl. No.: 17/056,257

(22) PCT Filed: May 30, 2018

(86) PCT No.: PCT/EP2018/064255
§ 371 (c)(1),
(2) Date: Nov. 17, 2020

(87) PCT Pub. No.: WO2019/228628
PCT Pub. Date: Dec. 5, 2019

(65) Prior Publication Data
US 2021/0213657 A1    Jul. 15, 2021

(51) Int. Cl.
*B29C 45/16* (2006.01)
*B29C 45/32* (2006.01)

(52) U.S. Cl.
CPC .......... *B29C 45/1628* (2013.01); *B29C 45/32* (2013.01); *B29C 2045/1617* (2013.01)

(58) Field of Classification Search
CPC ............ B29C 45/32; B29C 45/1628; B29C 2045/1617; B29C 45/33; B29C 45/1618;
(Continued)

(56) References Cited

U.S. PATENT DOCUMENTS 4,786,455 A * 11/1988 Krishnakumar .... B29C 45/7207
264/297.6
5,817,345 A * 10/1998 Koch ................... B29C 49/063
425/572

(Continued)

FOREIGN PATENT DOCUMENTS

| DE | 10164900 B4 | 9/2009 |
| EP | 1979148 B1 | 4/2013 |
| WO | 2007113305 A1 | 10/2007 |

*Primary Examiner* — Galen H Hauth
*Assistant Examiner* — Baileigh Kate Darnell
(74) *Attorney, Agent, or Firm* — Husch Blackwell LLP

(57) ABSTRACT

A method is provided for manufacturing a multi-component plastic molded part and a tool system. The method comprises a first injection molding step for molding at least one preform, and a second injection molding step for molding at least one second component onto the preform. The first and second injection molding steps are performed with an injection molding machine comprising a first outer half-mold and at least one second outer half-mold positioned on opposite sides of a rotatable carrier-block. The carrier-block has at least four side faces each comprising an inner half-mold. The preform in the first injection molding step the second component in the second injection molding step are simultaneously injection molded. The injection molding machine is opened by moving the first and second outer half-mold spaced apart from the rotatable carrier-block. The preform is carried out of the first injection molding step, the plastic molded part is carried out of the second injection molding step by rotating the carrier-block. The preform is cooled while carried by the inner-half mold on the carrier-block by means of a cooling medium. The plastic molded part is removed from the inner-half mold on the carrier-block by means of a handling means.

5 Claims, 2 Drawing Sheets

(58) Field of Classification Search
CPC ........ B29C 2045/338; B29C 2045/363; B29C 2045/1626; B29C 45/372; B29C 33/42; B29C 33/424
See application file for complete search history.

(56) References Cited

U.S. PATENT DOCUMENTS

| | | | | |
|---|---|---|---|---|
| 6,299,804 | B1 * | 10/2001 | Domodossola | B29C 45/7207 |
| | | | | 239/431 |
| 2005/0285287 | A1 * | 12/2005 | Okumura | B29C 45/73 |
| | | | | 249/134 |
| 2006/0244178 | A1 * | 11/2006 | Armbruster | B29C 45/006 |
| | | | | 264/328.8 |
| 2009/0065973 | A1 * | 3/2009 | Jung | B29C 45/045 |
| | | | | 264/254 |
| 2012/0086141 | A1 * | 4/2012 | Jung | B29C 45/1615 |
| | | | | 425/588 |
| 2014/0134366 | A1 * | 5/2014 | Armbruster | B29C 45/1418 |
| | | | | 264/250 |
| 2014/0265016 | A1 * | 9/2014 | Nguyen | B29C 43/04 |
| | | | | 425/408 |
| 2014/0319732 | A1 * | 10/2014 | Olaru | B29C 45/64 |
| | | | | 425/526 |
| 2016/0039136 | A1 * | 2/2016 | Armbruster | B29C 45/1628 |
| | | | | 425/577 |
| 2017/0036379 | A1 * | 2/2017 | Armbruster | B29C 45/1628 |
| 2018/0050477 | A1 * | 2/2018 | Duchateau | B29C 45/1759 |
| 2019/0105823 | A1 * | 4/2019 | Schad | B25J 9/02 |

* cited by examiner

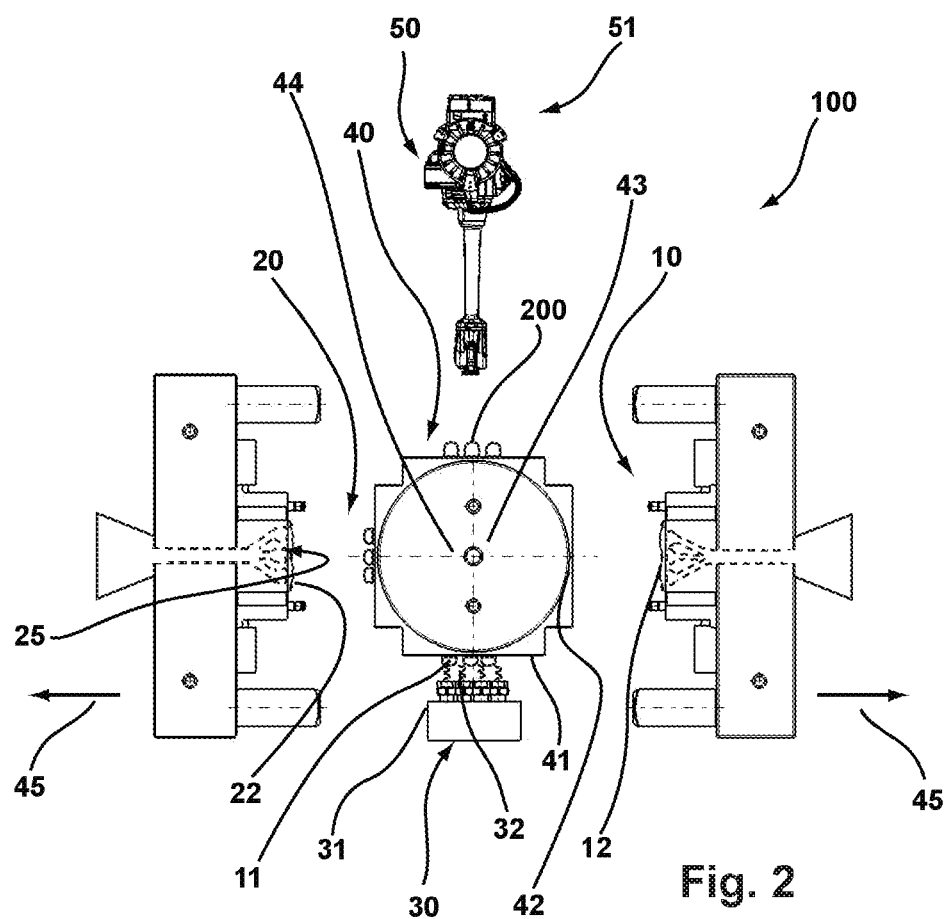
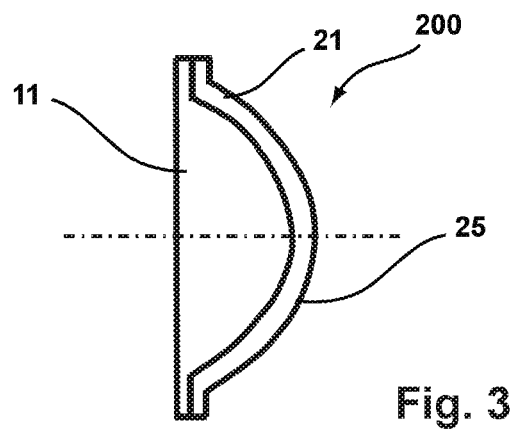

METHOD AND TOOL SYSTEM FOR MANUFACTURING A MULTI-COMPONENT PLASTIC MOLDED PART

CROSS REFERENCE

This application claims priority to PCT Application No. PCT/EP2018/064255, filed May 30, 2018, the entirety of which is hereby incorporated by reference.

FIELD OF THE INVENTION

The present invention relates to a method for manufacturing a multicomponent plastic molded part wherein the method comprises a first injection molding step for molding at least one preform and a second injection molding step for molding at least one second component onto the preform, whereas the first and a second injection molding step are performed with an injection molding machine comprising a first outer half-mold and at least one second outer half-mold positioned on opposite sides of a rotatable carrier block having at least four side faces each comprising an inner half-mold. The present invention furthermore relates to a tool system with an injection molding machine.

BACKGROUND

An injection molding machine for plastic parts is known from the DE 10 164 900 B4. The machine comprises a first outer half-mold and a second outer half-mold being carried on plates on opposite sides of a rotatable carrier element. The rotatable carrier element holds a first and a second inner half-mold. The injection molding machine can be moved into a closed position in which the first outer half-mold and the second outer half-mold match with the inner half-molds. A simultaneous first injection molding step is performed in that closed position, wherein cavities formed by the outer half-molds with respective inner half-molds are being filled with plastic mold. After the first injection molding step the machine can be put into an open position and the inner carrier element is turned by 180°, so that a first inner half-mold faces the second outer half-mold and the second inner half-mold faces the first outer half-mold. After closing the injection molding machine again, a two-component plastic mold part is formed in a second injection molding step by injection of plastic mold into the newly formed mold cavities.

An injection molding machine and transfer system for multi component injection molding is described in the EP 1 979 148 B1. The injection molding machine comprises a first and a second outer half-mold and inner half-molds. The inner and outer half-molds can be moved into a closed position for injection molding and an open position for transfer of a preform. After a first injection molding step and after opening of the injection molding machine preforms being carried by a rotatable carrier arm are rotatably moved into a cooling position 90° from the first injection molding step. Afterwards the preforms are transported to a second injection molding step another 90° further, where a second component is injected onto the preforms. In a position 90° the previous step and 270° from the first injection molding step plastic parts can be removed from the carrier arm of the injection molding machine.

The WO 2007/113305 A1 describes a method for manufacturing a multicomponent plastic molded part wherein the method comprises a first injection molding step for molding at least one preform and a second injection molding step for molding at least one second component onto the preform, whereas the first and second injection molding step are performed with an injection molding machine comprising a first outer half-mold and at least one second outer half-mold positioned on opposite sides of a rotatable carrier block, the carrier block having at least for side faces each comprising an inner half-mold, and whereas the method comprises at least the following steps: simultaneous injection molding of the preform in the first injection molding step and of the second component in the second injection molding step; and opening the injection molding machine by moving the first and second outer half-mold spaced apart from a rotatable carrier block. Furthermore, described is an injection molding machine comprising a first outer half-mold and a second outer half-mold and comprising a rotatable carrier block with four sides each comprising four inner half-molds configured to per-form a method for manufacturing a multicomponent plastic molded part. The arrangement with the carrier block holding four inner half-molds allows for an efficient use of the injection molding machine, as preparational work for a following injection molding step can be performed on two vacant inner half-molds simultaneous to an ongoing injection molding step with the two remaining inner half molds.

A disadvantage of this method and arrangement lies in loss of time for cooling and removing of the preform and plastic molded parts, which remain in the outer-half molds after the first and second injection molding step. Another disadvantage is, that four inner half-molds with a distinctive form are needed to perform the method and operate the machine as desired.

SUMMARY OF THE INVENTION

It is an objective of the present invention to provide a method and a means for an inexpensive and efficient molding of multi component plastic molded parts with a short cycle time. It is furthermore an objective of the invention to provide a solution for the production of thick-wall optics, light-relevant optics and/or optical lenses with a functional micro structure.

The invention discloses the technical teaching, that the method comprises at least the following steps: carrying the preform out of the first injection molding step and carrying the plastic molded part out of the second injection molding step by rotating the carrier block, cooling the preform while carried by the inner half-mold on the carrier block by means of a cooling medium and removing the plastic molded part from the inner half mold on the carrier block by means of a handling means.

The core of the invention lies in the reduction of production costs and shorter cycle times enabled by the multi functionality of the carrier block, acting as a means of transportation of the preform and plastic molded part and also functioning as a support of the inner half-molds. Short cycle times are particularly enabled by reducing the transportation time between the first, second injection molding step and the cooling step and the removing step.

The invention discloses that the cooling of the preform while being held by the inner half-mold of the carrier block is performed simultaneous with injection molding of the preform in the first injection molding step and of the second component in the second injection molding step.

This has the advantage that sufficient time for cooling down of the preform is given and damage due to thermal stresses are avoided. In other words, high quality of the preforms can be ensured. Furthermore, cycle times can be kept short as waiting for a cooling of the preform before the second the injection molding step can be avoided.

As a preferred embodiment the removing of the plastic molded part from the inner half-mold of the carrier block is performed simultaneously with injection molding of the preform in the first injection molding step and of the second component in the second injection molding step.

This means that sufficient time for a safe removal of the plastic molded part during the comparatively long injection molding step is ensured.

According to another preferred embodiment the first outer half-mold, the second outer half-mold and the inner half-molds for performing the first and second injection molding step are heated up while simultaneously cooling the preform while carried by the inner half-mold on the carrier block by means of said cooling medium is performed and/or simultaneously removing the plastic molded part from the inner half-mold on the carrier block by means of the handling means is performed. This leads to the advantage of further reducing the cycle time and giving sufficient time for the heating cycle thus reducing thermal stress and were onto the molds.

Yet another embodiment of the present method can be seen in that the first outer half-mold, the second outer half-mold and the inner half-molds are cooled down after performing the first and second injection molding step while simultaneously cooling the preform while carried on the inner half-mold on the carrier clock by means of a cooling medium is performed and/or simultaneously removing the plastic molded part from the inner half-mold on the carrier block by means of the handling system is performed.

This enables a reduction in cycle time and allows sufficient time for gradual cooling the half-molds. Consequently, thermal stresses on the half-molds are reduced and life time increased.

The present invention is also embodied in a tool system with an injection molding machine comprising a first outer half-mold and a second outer half-mold and comprising a rotatable carrier-block with at least four side faces each comprising at least one inner half-mold configured to perform a method for manufacturing a multi component plastic molded part according to a method as described above.

Advantageously the tool system comprises a streaming means for streaming a cooling medium onto the preform, in particular an air stream, and whereas the tool comprises a handling arm for removing the plastic molded part from the inner half-mold. The use of an air stream means has the advantage of an increased cooling rate of the preform and thus a shortening of production cycle times. In addition, the area of cooling on the preform can be controlled by directing the air stream on a particular area of the pre-form, thus controlling temperature distribution and avoiding thermal stresses in the preform. It can be of advantage to have the air stream means movable allowing to be positioned close to the preform while cooling the preform and being distanced to the carrier-block during rotation of the carrier-block. The use of the handling arm has the advantage that removing the plastic molded part is an automated repetitive process, in which damage to the plastic molded part due to uncontrolled movements is avoided.

Yet another preferred embodiment of the present invention comprises the first outer half-mold, second outer half-mold and the inner half-molds feature a structure for molding a plurality of multi-component plastic molded parts in only one simultaneous first injection molding step and second injection molding step. This has the advantage of significant cost reduction by economy of scale by increasing the number of produced plastic molded parts while only needing a single injection molding machine.

According to another preferred embodiment the inner half-molds for molding and holding the preform and holding the plastic molded part are designed identical and the first and the second outer half-molds comprise a different design to one another. This allows for a particularly inexpensive and efficient production by providing a four-step simultaneous quasi inline-production-process. Production and machine costs can be reduced significantly if the inner half-molds are inexpensive and the outer half-molds are of a higher value as they need to be provided only once and can be used. Furthermore, this arrangement provides the possibility to provide a particularly large volume preform with a high heat capacity from the first injection molding step and give sufficient time for a cooling down before a second component of less volume and lower heat capacity is molded onto the preform.

In yet another preferable embodiment the second outer half-mold comprise a micro structured mold design and/or light-relevant structures, in the following named microstructures as a summing up wording. This has the advantage, that the most critical, expensive and value adding production step is performed at a late stage in the production process. Therefore, reducing the risk of damage to the expensive and delicate micro structure before finalization of the production process. Another advantage is, that if a damage to the preform is recognized the expensive second injection molding step in which the microstructure is added can be omitted. Thus, an unnecessary heating and cooling cycle to the expensive micro structured mold can be avoided and costs can be saved.

The aforementioned components, as well as the claimed components and the components to be used in accordance with the invention in the described embodiments are not subject to any special exceptions with respect to their size shaped material selection and technical components such that the selection criteria known in the pertinent field can be applied without limitations.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 2 illustrates the tool system with the injection molding machine in a top view.

FIG. 3 illustrates a preform in a schematic sectional side view.

DETAILED DESCRIPTION OF THE DRAWINGS

Figure 1:
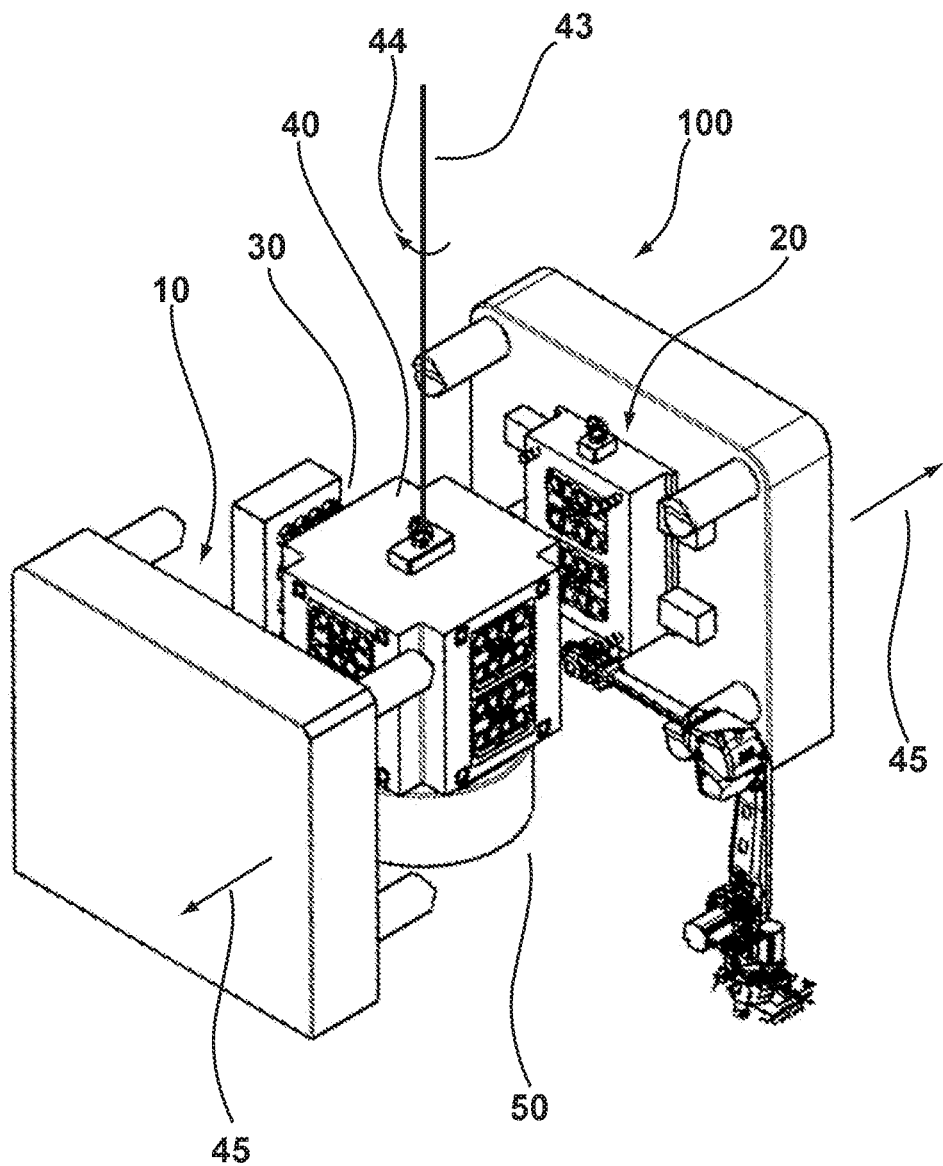
FIG. 1 is a perspective view of a tool system with an injection molding machine.

The present invention is not limited by the embodiment described above, which is represented as an example only and can be modified in various ways within the scope of protection defined by the appending patent claims. Thus, the invention is also applicable to different embodiments, in particular of the method for manufacturing a multi-component plastic molded part and a tool system with an injection molding machine.

Depicted in FIGS. 1 and 2 is the tool system 100 with the injection molding machine comprising a first outer half-mold 12 and a second outer half-mold 22 and a rotational carrier-block 40. The carrier-block 40 is rotatable around a rotational axis 43, comprises four side faces 41 each holding an inner half-mold 42. The injection molding machine is in an open position, wherein the first outer half-mold 12 and the second outer half-mold 22 were moved into a spaced apart direction 45. The carrier-block 40 is positioned centrally between the first and second outer half-mold 12 and 22.

FIG. 2 in particular shows the tool system in operation, wherein after a first and second injection molding step 10 and 20 the injection molding machine was opened and a newly molded preform 11 was transported by clockwise rotation 44 of the carrier block 40 to a cooling step 30 and a newly produced plastic molded part 200 was simultaneously transported to a handling step 50. The second outer half mold 22 comprises a micro structure 25 which is molded onto the preform together with a second component 21 forming the plastic molded part 200. In the cooling step 30 a streaming means 31 directs an air stream onto the preform 11 for cooling. The handling means reaches out to the newly produced plastic molded part 200 for removing the plastic molded part 200 from the inner half-mold 42 on the carrier block 40. The amount of material being injected into a cavity build of the inner half-mold 42 and the first outer half-mold 12 during the first injection molding step 10 is higher than the amount of material injected into second injection molding step 20. Therefore, cooling of the preform 11 is of particular importance to ensure a timely cooling of the preform 11 and thus enable a quick following second injection molding step 20.

Simultaneous to the above described operational steps 10, 20, 30, 50 the first and second outer half-mold 12 and 22 and the two inner half-molds 42 facing the first and second outer half molds 12 and 22 are being heated in preparation for the following first and second injection molding steps 10 and 20. Also simultaneously the inner half-mold 42 facing the handling means 51 and the streaming means 31 are being cooled to facilitate the cooling of the preform 11 and the cooling of the plastic molded part 200 respectively. The handling means 51 and the stream means 31 comprise a temperature sensor to measure the temperature of the preform 11 and the plastic molded part 200 and determine if removing and continuing to the second-injection molding step 20 is possible. Furthermore, the handling means 51 and the stream means 31 comprise a camera unit and analysis unit for detection of defects on the preform 11 and plastic molded part 200 to initiate corrective actions in the production process if needed.

FIG. 3 depicts the plastic molded part 200 comprising the preform 11 and with the second component 21 carrying the micro structure 25 molded onto the preform 11 in the second injection molding step 20, whereas the micro structure 25 also can form light-relevant structures.

LIST OF NUMERALS

100 tool system
200 plastic molded part
10 first injection molding step
11 preform
12 first outer half-mold
20 second injection molding step
21 second component
22 second outer half-mold
25 microstructure
30 cooling step
31 streaming means
32 cooling medium
40 carrier block
41 side face
42 inner half-mold
43 rotational axis
44 clockwise rotation
45 spaced apart direction
50 handling step
51 handling means

The invention claimed is:

1. A method for manufacturing a plurality of plastic molded parts each comprising a preform and a second component via an injection molding machine that includes a first outer half-mold and a second outer half-mold positioned on opposite sides of a rotatable carrier-block, the second outer half-mold including a micro structure, the carrier-block having at least four side faces each comprising an inner half-mold, the method comprising:
   injection molding a first preform via a first injection molding step of the injection molding machine;
   opening the injection molding machine by moving the first outer half-mold and the second outer half-mold outwardly away from the rotatable carrier-block;
   carrying the first preform by rotating the carrier-block;
   streaming a cooling medium onto the first preform to cool the first preform while the first preform is carried by the inner-half mold on the carrier-block;
   injection molding at least one second component onto the first preform via a second injection molding step of the injection molding machine to form a first plastic molded part simultaneously with the injection molding of a second preform;
   opening the injection molding machine by moving the first outer half-mold and the second outer half-mold outwardly away from the rotatable carrier-block;
   carrying the second preform and carrying the first plastic molded part by rotating the carrier-block;
   streaming a cooling medium onto the second preform to cool the second preform while the second preform is carried by the inner-half mold on the carrier-block; and
   removing the first plastic molded part from the inner-half mold on the carrier-block by means of a handling arm,
   wherein the first injection molding step and the second injection molding step of the injection molding machine are performed simultaneously with at least one of:
      streaming the cooling medium onto one of the preforms; and
      removing one of the plastic molded parts from the inner half-mold on the carrier-block using the handling arm.

2. The method according to claim 1, wherein the cooling of one of the preforms while being held by the inner-half mold on the carrier-block is performed simultaneously with the first and second injection molding steps.

3. The method according to claim 1, wherein the removing of one of the plastic molded parts from the inner-half mold of the carrier-block is performed simultaneously with the first and second injection molding steps.

4. The method according to claim 1, wherein the first outer half-mold, the second outer half-mold and the inner half-molds for performing the injection molding steps are heated up while at least one of the cooling and removing steps is performed.

5. The method according to claim 1, wherein the first outer half-mold, the second outer half-mold and the inner half-molds are cooled down after performing the injection molding steps while at least one of the cooling and removing steps is performed.

* * * * *